US009843837B2

United States Patent
Gopalan (10) Patent No.: US 9,843,837 B2
(45) Date of Patent: Dec. 12, 2017

(54) CROSS-PLATFORM ANALYSIS

(71) Applicant: AT&T INTELLECTUAL PROPERTY I, L.P., Atlanta, GA (US)

(72) Inventor: Raghuraman Gopalan, Freehold, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 128 days.

(21) Appl. No.: 14/817,105

(22) Filed: Aug. 3, 2015

(65) Prior Publication Data

US 2017/0041670 A1 Feb. 9, 2017

(51) Int. Cl.
*H04N 7/16* (2011.01)
*H04N 21/466* (2011.01)
*H04N 21/44* (2011.01)
*H04N 21/442* (2011.01)
*H04N 21/43* (2011.01)

(52) U.S. Cl.
CPC ..... *H04N 21/4666* (2013.01); *H04N 21/4302* (2013.01); *H04N 21/442* (2013.01); *H04N 21/44008* (2013.01); *H04N 21/4667* (2013.01)

(58) Field of Classification Search
CPC ........... H04N 7/17318; H04N 7/17336; H04N 7/165; H04N 7/173; H04N 21/47202; H04N 21/812; H04N 21/6125; H04N 21/235; H04N 21/435
USPC ......... 725/93–94, 115–119, 17, 49; 709/231, 709/232
See application file for complete search history.

(56) References Cited

U.S. PATENT DOCUMENTS 6,028,586 A    2/2000  Swan et al.
6,970,602 B1 * 11/2005  Smith ............ H04N 21/234336
                                                375/E7.137

(Continued)

FOREIGN PATENT DOCUMENTS

CA    2672735 A1   6/2008
WO    03084118 A1  10/2003

OTHER PUBLICATIONS

Gros, P. et al., "Automatic video structuring based on HMMs and audio visual integration", Proceedings of the Second International Symposium on Image/Video Communications over Fixed and Mobile Networks, 2004, Retrieved from http://www.irisa.fr/metiss/guig/biblio/04/kijak-isivc-04.pdf, 10 pages.

(Continued)

*Primary Examiner* — Annan Shang
(74) *Attorney, Agent, or Firm* — Toler Law Group, PC (57) ABSTRACT

A method includes receiving, at a processor, a first data stream from a first platform and a second data stream from a second platform. The first data stream includes content and the second data stream includes the content. The method also includes performing an analysis operation on the first data stream and the second data stream to interpret the content. Performing the analysis operation includes performing a statistical analysis on the first data stream and the second data stream using one or more Artificial Neural Network (ANN) nodes of an analytical network. Performing the analysis operation also includes performing a syntactic analysis on the first data stream and the second data stream using one or more Markov Logic Network (MLN) nodes of the analytical network.

20 Claims, 4 Drawing Sheets

(56) References Cited

U.S. PATENT DOCUMENTS

| | | | |
|---|---|---|---|
| 7,404,201 B2* | 7/2008 | Takeuchi | G06F 17/3089 |
| | | | 348/E7.073 |
| 7,610,011 B2 | 10/2009 | Albrett | |
| 7,796,598 B2 | 9/2010 | Pereira et al. | |
| 7,936,916 B2 | 5/2011 | Zhang et al. | |
| 8,024,762 B2* | 9/2011 | Britt | H04N 7/1675 |
| | | | 725/92 |
| 8,271,025 B2 | 9/2012 | Brisebois et al. | |
| 8,346,945 B2 | 1/2013 | Bouazizi | |
| 8,402,497 B2* | 3/2013 | Chang | H04N 7/17318 |
| | | | 386/292 |
| 8,539,320 B2 | 9/2013 | Poulain | |
| 8,589,548 B2* | 11/2013 | Karaoguz | H04N 7/163 |
| | | | 348/207.1 |
| 8,621,539 B1* | 12/2013 | Monk | H04L 12/2801 |
| | | | 725/111 |
| 8,631,143 B2* | 1/2014 | Simonds | H04N 21/21805 |
| | | | 709/225 |
| 8,816,529 B2* | 8/2014 | Hofheinz | G01R 27/18 |
| | | | 307/19 |
| 8,836,502 B2 | 9/2014 | Culbert et al. | |
| 8,848,544 B2* | 9/2014 | Bar-Tor | H04L 41/0631 |
| | | | 370/250 |
| 8,856,846 B2* | 10/2014 | Applegate | H04N 21/2225 |
| | | | 725/86 |
| 8,966,107 B2 | 2/2015 | Boss et al. | |
| 9,049,270 B2* | 6/2015 | Poulain | H04H 20/103 |
| 2003/0007515 A1 | 1/2003 | Apostolopoulos et al. | |
| 2004/0221315 A1* | 11/2004 | Kobayashi | G06F 3/14 |
| | | | 725/126 |
| 2007/0043452 A1* | 2/2007 | Buscema | G06N 3/0481 |
| | | | 700/48 |
| 2007/0204057 A1* | 8/2007 | Shaver | G06F 17/30902 |
| | | | 709/231 |
| 2007/0266134 A1* | 11/2007 | Shyy | H04W 99/00 |
| | | | 709/223 |
| 2008/0025204 A1 | 1/2008 | Radha et al. | |
| 2008/0092181 A1* | 4/2008 | Britt | H04N 7/1675 |
| | | | 725/87 |
| 2008/0189753 A1 | 8/2008 | Nesvadba et al. | |
| 2008/0288255 A1 | 11/2008 | Carin et al. | |
| 2009/0063681 A1* | 3/2009 | Ramakrishnan | H04N 7/17318 |
| | | | 709/225 |
| 2009/0187540 A1* | 7/2009 | Richardson | G06F 17/30867 |
| 2010/0169910 A1* | 7/2010 | Collins | G06Q 30/0251 |
| | | | 725/14 |
| 2010/0208086 A1* | 8/2010 | Kothandaraman | H04N 5/23232 |
| | | | 348/208.4 |
| 2011/0231523 A1* | 9/2011 | Haugland | H04L 29/12009 |
| | | | 709/219 |
| 2012/0215728 A1* | 8/2012 | Isaiadis | G06N 3/08 |
| | | | 706/25 |
| 2013/0179916 A1* | 7/2013 | Roberts | H04N 21/2407 |
| | | | 725/32 |
| 2014/0040970 A1* | 2/2014 | Alexander | H04L 67/141 |
| | | | 725/116 |
| 2015/0016626 A1 | 1/2015 | Millington | |
| 2015/0142753 A1* | 5/2015 | Soon-Shiong | G06F 17/3002 |
| | | | 707/673 |
| 2017/0061279 A1* | 3/2017 | Yang | G06N 3/04 |

OTHER PUBLICATIONS

Janevski, T, "Statistical analysis of multicast versus instant channel changing unicast IPTV provisioning", Proceedings of the 16th Telecommunications Forum (TELFOR'08), 2008, pp. 96-99.

La Corte, A. et al., "An analytical paradigm to calculate multiplexer performance in an ATM multimedia environment"; Computer Networks and ISDN Systems, Dec. 1997, vol. 29, Issue 16, pp. 1881-1900.

Leykin, A. et al., "Thermal-visible video fusion for moving target tracking and pedestrian classification", IEEE Conference on Computer Vision and Pattern Recognition, IEEE, 2007, Retrieved from http://cgi.cs.indiana.edu/~oleykin/website/download/otobvs2007.pdf, pp. 1-8.

Lin, T. et al., "A neural-network-based context-aware handoff algorithm for multimedia computing", ACM Transactions on Multimedia Computing, Communications, and Applications (TOMM), vol. 4, Issue 3, Aug. 2008, 4 pages.

Ospina, N., "Synchronized Audiovisual Synopsis Using Audio Self-Similarity Analysis, Video Summarization and Multimedia Semantic Description Tools", Diss. University of Miami, May 2006, Retrieved from http://mue.music.miami.edu/wp-content/uploads/2013/10/NicBThesis.pdf, 184 pages.

Sapino, M. et al., "Log-analysis based characterization of multimedia documents for effective delivery of distributed multimedia presentations", Proc. DMS06-2006, 2006, 4 pages.

Xu, C. et al., "Sports video analysis: semantics extraction, editorial content creation and adaptation" Journal of Multimedia, vol. 4, No. 2, Apr. 2009, Retrieved from http://academypublisher.com/ojs/index.php/jmm/article/viewFile/04026979/1264, pp. 69-79.

* cited by examiner

CROSS-PLATFORM ANALYSIS

FIELD OF THE DISCLOSURE

The present disclosure is generally related to analyzing content across multiple platforms.

BACKGROUND

Multimedia devices may receive multimedia content from different platforms. As non-limiting examples, a multimedia device may receive multimedia content from a television platform, an internet platform, a mobile platform, etc. A user of the multimedia device may select to receive the content from a first platform; however, a change in network contents may degrade content delivery. For example, the user may select to stream a video to the multimedia device from the internet platform; however, a degraded signal may cause the video to freeze or skip. The multimedia device may automatically "switch" to another platform (e.g., the mobile platform) to provide the video in response to detecting the degraded signal associated with the internet platform. However, switching to the mobile platform may also result in video skipping if the content is not synchronized at the multimedia device to provide a seamless (e.g., uninterrupted) video experience. To successfully switch between platforms with reduced interference (e.g., reduced video skipping or video freezing), the multimedia device may need to ensure that the content as delivered from the first platform and the content as delivered from the second platform is substantially synchronized.

Additionally, advertisers may provide advertisements to the user based on user content preferences. To effectively provide advertisements, the advertiser may need to learn the user content preferences.

DETAILED DESCRIPTION

Techniques for interpreting content from multiple platforms are disclosed. A multimedia device may receive multimedia content (e.g., streaming video, streaming audio, etc.) from multiple platforms. As non-limiting examples, the multimedia device may receive the multimedia content from an internet platform, a mobile platform, a television platform, etc. The content may be presented using one or more modalities, such as visually, audibly, etc. The multimedia device may include an analytical network that is configured to "interpret" the content based on the one or more modalities. As non-limiting examples, the analytical network may determine whether content is synchronized across the platforms, identify user content preferences based on content, integrate user profiles across multiple platforms based on the content, etc. To interpret the content, the analytical network may include one or more Markov Logic Networks that are integrated with an Artificial Neural Network. The Artificial Neural Network may be based on a Convolutional Neural Network, an Autoencoder (e.g., a Diabolo Network), a Recursive Neural Network (RNN), or a fully connected network. As described below, the Markov Logic Networks may provide a syntactic analysis and the Artificial Neural Network may provide a statistical analysis to interpret the content for different uses cases.

In one implementation of the disclosed techniques, a method includes receiving, at a processor, a first data stream from a first platform and a second data stream from a second platform. The first data stream includes content and the second data stream also includes the content. The method also includes performing an analysis operation on the first data stream and the second data stream to interpret the content. Performing the analysis operation includes performing a statistical analysis on the first data stream and the second data stream using one or more Artificial Neural Network (ANN) nodes of an analytical network. Performing the analysis operation also includes performing a syntactic analysis on the first data stream and the second data stream using one or more Markov Logic Network (MLN) nodes of the analytical network.

In another implementation of the disclosed techniques, an apparatus includes a first Artificial Neural Network (ANN) node configured to receive a first vector based on a first modality of content. The content is included in a first data stream from a first platform and in a second data stream from a second platform. The apparatus also includes a second ANN node configured to receive a second vector based on a second modality of the content. The apparatus further includes a first Markov Logic Network (MLN) node configured to receive an output of the first ANN node. The apparatus also includes a second MLN node configured to receive an output of the second ANN node.

In another implementation of the disclosed techniques, a computer-readable storage device includes instructions that, when executed by a processor within a receiving terminal, cause the processor to perform operations including receiving a first data stream from a first platform and a second data stream from a second platform. The first data stream includes content and the second data stream also includes the content. The operations also include performing an analysis operation on the first data stream and the second data stream to interpret the content. Performing the analysis operation includes performing a statistical analysis on the first data stream and the second data stream using one or more Artificial Neural Network (ANN) nodes of an analytical network. Performing the analysis operation also includes performing a syntactic analysis on the first data stream and the second data stream using one or more Markov Logic Network (MLN) nodes of the analytical network.

Figure 1:
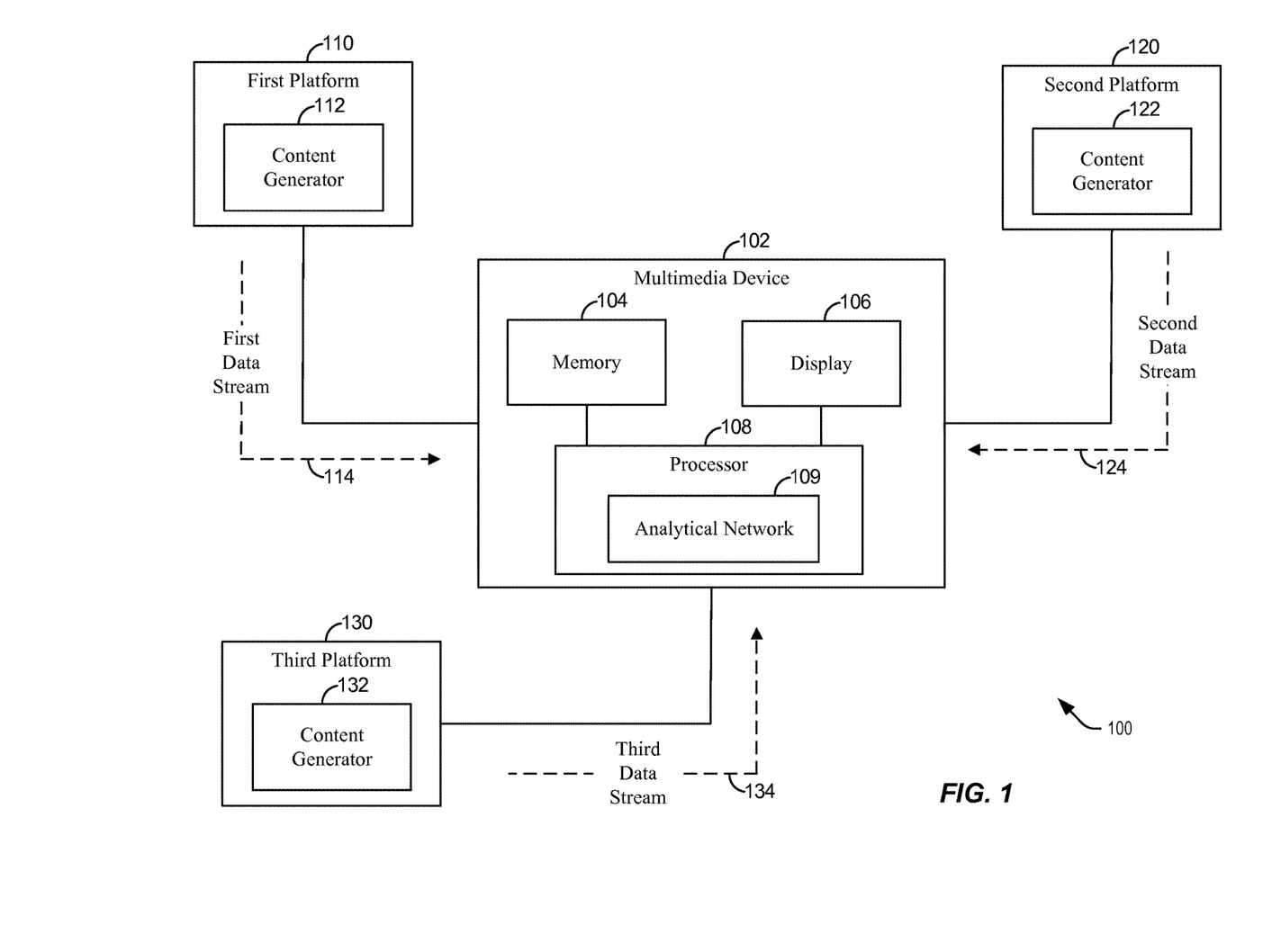
FIG. 1 is a block diagram of a system that supports an analytical network configured to interpret content delivered from multiple platforms.
Figure 2:
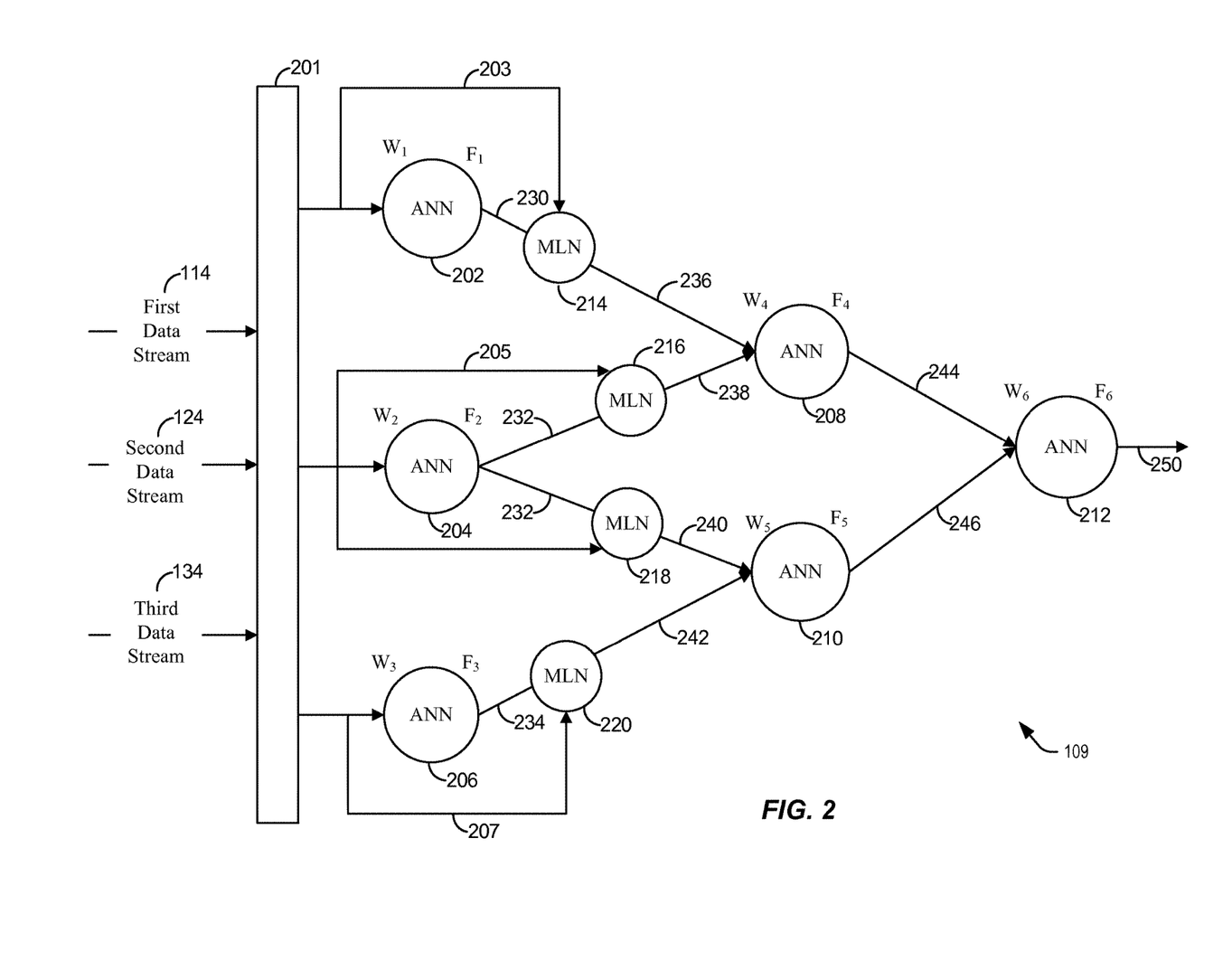
FIG. 2 is a diagram of the analytical network of FIG. 1.

FIG. 1 is a block diagram of a system 100 that supports an analytical network configured to interpret content delivered from multiple platforms. The system 100 includes a multimedia device 102. The multimedia device 102 includes a memory 104, a display 106, and a processor 108. In the implementation of FIG. 1, the memory 104 is coupled to the processor 108 via a bus, and the display 106 is coupled to the processor 108 via a bus. The processor 108 includes an analytical network 109 that is configured to interpret multimedia content across multiple platforms. For example, the analytical network 109 may determine whether multimedia content across multiple platforms is synchronized at the multimedia device 102, identify user content preferences based on content provided by multiple platforms, integrate user profiles across multiple platforms, perform other functions, or a combination thereof. As illustrated in FIG. 2, the analytical network 109 may include one or more Markov Logic Networks that are integrated with an Artificial Neural Network.

The specific function (or functions) performed by the analytical network 109 may be based on the configuration and logic of the Markov Logic Networks and the Artificial Neural Network. For ease of description, the analytical network 109 is described as being configured to determine whether multimedia content across multiple platforms is synchronized. However, it should be understood that this function is for illustrative purposes only and should not be construed as limiting. In other implementations, the analytical network 109 may be configured to identify user content preferences based on content provided by multiple platforms, integrate user profiles across multiple platforms, perform other functions, or a combination thereof.

The multimedia device 102 may include, but is not limited to, one or more media devices and one or more output devices (e.g., one or more sound systems, one or more display devices, or combinations thereof), one or more computing systems, one or more portable computing devices (e.g., one or more laptop computers, tablet computers, computerized glasses, personal digital assistants, etc.), one or more mobile communication devices (e.g., a mobile phone, a smart phone, a cellular phone, etc.), other devices, or combinations thereof.

A first platform 110 may be communicatively coupled to provide a first data stream 114 to the multimedia device 102. For example, the first platform 110 may include a content generator 112 that is configured to generate particular content. Non-limiting examples of the particular content may include streaming video, streaming audio, etc. After generation at the content generator 112, the particular content may be provided to the multimedia device 102 via the first data stream 114. In a similar manner, the second platform 120 may be communicatively coupled to provide a second data stream 124 to the multimedia device 102. For example, the second platform 120 may include a content generator 122 that is also configured to generate the particular content. After generation at the content generator 122, the particular content may be provided to the multimedia device 102 via the second data stream 124. Similarly, the third platform 130 may be communicatively coupled to provide a third data stream 134 to the multimedia device 102. For example, the third platform 130 may include a content generator 132 that is also configured to generate the particular content. After generation at the content generator 132, the particular content may be provided to the multimedia device 102 via the third data stream 134.

As described herein, each platform 110, 120, 130 may include a different median for providing the particular content to the multimedia device 102. As a non-limiting example, the first platform 110 may be a television platform, the second platform 120 may be a mobile platform, and the third platform 130 may be an internet platform. In one implementation, one or more platforms 110, 120, 130 may provide the respective data stream 114, 124, 134 to the multimedia device 102 via a wireless network. In another implementation, one or more platforms 110, 120, 130 may provide the respective data stream 114, 124, 134 to the multimedia device 102 via a wired network.

Each data stream 114, 124, 134 may include data indicative of different modalities of the particular content. To illustrate, if the particular content includes streaming video (e.g., a streaming movie), each data stream 114, 124, 134 may include data indicative of visual properties for each frame of the streaming video, data indicative of audio properties for each frame of the streaming video, etc. It should be noted that visual properties and audio properties are merely non-limiting examples of different modalities that are included in the data streams 114, 124, 134. As used herein, a "modality" may include any mode (or form) in which the particular content is experienced or expressed. Other modalities may include linguistic properties (e.g., text, chat, etc.), location, etc.

As described in greater detail with respect to FIG. 2, the analytical network 109 may use different modalities in the data streams 114, 124, 134 to interpret the particular content from each platform 110, 120, 130 at the multimedia device 102. As a non-limiting example, based on the modalities, the analytical network 109 may include one or more Markov Logic Networks that are integrated with an Artificial Neural Network to determine whether the particular content from each data stream 114, 124, 134 is synchronized.

To illustrate an non-limiting exemplary implementation where the analytical network 109 determine whether the particular content is synchronized across the multiple platforms 110, 120, 130, an output (e.g., a binary value) of the analytical network 109 may indicate whether the particular content in the data streams 114, 124, 134 is synchronized at the multimedia device 102. The output may be based on one or more modalities in the data streams 114, 124, 134. If the output is a binary "1", the processor 108 may determine that the particular content is synchronized. If the particular content in the data streams 114, 124, 134 is synchronized, the processor 108 may provide the particular content to a user of the multimedia device 102 (via the display 106) using any platform 110, 120, 130 for a seamless user experience. For example, the user of the multimedia device 102 may select to view the particular content from the first platform 110 (e.g., the "preferred" platform). After user selection, the processor 108 may provide the particular content to the display 106 (for user viewing) using the first platform 110. However, if network conditions interrupt the first platform 110 from seamlessly providing the first data stream 114 to the multimedia device 102, the processor 108 may "switch" to the second platform 120 (or to the third platform 130) to provide the particular content to the display 106 without interruptions (e.g., without video freezing, video skipping, etc.).

If the output of the analytical network 109 is a binary "0", the processor 108 may determine that the particular content in one or more of the data streams 114, 124, 134 is not synchronized. If the particular content is not synchronized, the processor 108 may be configured to buffer (or otherwise adjust) the particular content in one or more of the data streams 114, 124, 134 to improve synchronization.

The system 100 of FIG. 1, more specifically the analytical network 109, may use statistical and syntactic learning methodologies by combining principles from Artificial Neural Networks and Markov Logic Networks to interpret content from multiple platforms 110, 120, 130. For example, the data streams 114, 124, 134 obtained from the different platforms 110, 120, 130 may undergo feature selection (e.g., modality selection) and/or distance metric selection and resulting vectors may be provided to input nodes of the analytical network 109 (e.g., Artificial Neural Network nodes), as further described with respect to FIG. 2. The input nodes may be statistical nodes that are data-driven. Syntactic patterns (e.g., Markov Logic Networks) may be superimposed to determine relationships between the content modalities and platforms 110, 120, 130 by integrating logic rules in the form of AND, OR, and NOR information and by merging the logic rules with probabilistic estimates using principles from Gaussian parametric models. Based on the statistical and syntactic learning methodologies, the analytical network 109 may determine whether the particular content from each data stream 114, 124, 134 is synchronized, as a non-limiting example. If the particular content from each data stream 114, 124, 134 is synchronized, the processor 108 may provide the particular content to a user of the multimedia device 102 (via the display 106) using any platform 110, 120, 130 for a seamless user experience.

Additionally, the analytical network 109 may use statistical and syntactic learning methodologies by combining principles from Artificial Neural Networks and Markov Logic Networks to identify user content preferences based on content provided by the multiple platforms 110, 120, 130, integrate user profiles across the multiple platforms 110, 120, 130, perform other functions, or a combination thereof. Based on the identified user preferences, the processor 108 may suggest additional content that may be of interest to the user. Third-parties may also be privy to the identified user content preferences for advertisement purposes.

Referring to FIG. 2, a diagram of the analytical network 109 is shown. The analytical network 109 includes a modality processing network 201, multiple Artificial Neural Network (ANN) nodes 202, 204, 206, 208, 210, 212, and multiple Markov Logic Network (MLN) nodes 214, 216, 218, 220. The analytical network 109 may be configured to receive the data streams 114, 124, 134 and generate an output 250 indicating an interpretation of the particular content from the data streams 114, 124, 134. As a non-limiting example, the analytical network 109 may indicate that the particular content is synchronized if the output 250 has a binary value of "1", and the analytical network 109 may indicate that the particular content is not synchronized if the output 250 has a binary value of "0".

The modality processing network 201 may be configured to receive the data streams 114, 124, 134 and to generate modality-based vectors 203, 205, 207. For example, the modality processing network 201 may perform feature selection (e.g., modality selection) and distance metric selection to generate the modality-based vectors 203, 205, 207. To illustrate, the modality processing network 201 may generate a vector 203 indicative of a first modality (e.g., visual properties or pixel characteristics) for each data stream 114, 124, 134, a vector 205 indicative of a second modality (e.g., audio properties) for each data stream 114, 124, 134, and a vector 207 indicative of a third modality (e.g., linguistic properties) of each data stream 114, 124, 134.

For example, the vector 203 may include a first component indicating visual properties for the first data stream 114, a second component indicating visual properties for the second data stream 124, and a third component indicating visual properties for the third data stream 134. The vector 205 may include a first component indicating audio properties for the first data stream 114, a second component indicating audio properties for the second data stream 124, and a third component indicating audio properties for the third data stream 134. The vector 207 may include a first component indicating linguistic properties for the first data stream 114, a second component indicating linguistic properties for the second data stream 124, and a third component indicating linguistic properties for the third data stream 134. The vector 203 may be provided to the ANN node 202, the vector 205 may be provided to the ANN node 204, and the vector 207 may be provided to the ANN node 206. Thus, the ANN node 202 may be configured to receive the vector 203 based on a first modality of content, the ANN node 204 may be configured to receive the vector 205 based on the second modality of the content, and the ANN node 206 may be configured to receive the vector 207 based on the third modality of the content.

The ANN nodes 202, 204, 206 and the MLN nodes 214, 216, 218, 220 may be included in an "input layer" of the analytical network 109. For example, the ANN nodes 202, 204, 206 and the MLN nodes 214, 216, 218, 220 may be configured to receive the vectors 203, 205, 207. The ANN nodes 208, 210 may be included in a "hidden layer" of the analytical network 109. For example, inputs to the analytical network 109 and the output 250 are not directly provided to the ANN nodes 208, 210 (e.g., are "hidden" from the ANN nodes 208, 210). The ANN node 212 may be included in an "output layer" of the analytical network 109. For example, the ANN node 212 may generate the output 250 of the analytical network 109.

As described above, the analytical network 109 may interpret the particular content from the data streams 114, 124, 134 based on one or more modalities. For ease of illustration, the particular content described with respect to FIG. 2 is streaming video content and the modalities used by the analytical network 109 corresponds to visual properties (e.g., pixel characteristics), audio properties, and linguistic properties. The properties, in addition to being derived from observed data, may also be leveraged using appropriate geometry (e.g., structures) inherent to the process that generates the data. Non-limiting examples of the geometry inherent to the process include filtering structures on a spherical surface to render lighting properties of visual data, convolutional mechanisms that result in variations in phoneme properties of audio data, and Riemannian structures underneath the human vocabulary that affect the sentence syntactic properties of linguistic data. It should be understood that in other implementations, the particular content may be different and other modalities may be used to interpret the particular content from the data streams 114, 124, 134. Additionally, for ease of illustration, the analytical network 109 is described as determining whether the particular content from the data streams 114, 124, 134 is synchronized. However, alternative logic designs may enable the analytical network 109 to perform alternative functions (e.g., identify user content preferences based on content provided by the multiple platforms 110, 120, 130, integrate user profiles across the multiple platforms 110, 120, 130, perform other functions, or a combination thereof).

Prior to processing the data streams 114, 124, 134 in real-time, the ANN nodes 202-212 of the analytical network 109 may be "trained" to determine whether the content of incoming data streams is synchronized. As used herein, "training" an ANN node may include assigning a weight to the ANN node to scale a corresponding input with respect to other inputs at a similar layer. To illustrate (at the input layer), the ANN node 202 may apply a weight ($W_1$) to the vector 203, the ANN node 204 may apply a weight ($W_2$) to the vector 205, and the ANN node 206 may apply a weight ($W_3$) to the vector 207. Each weight ($W_1$, $W_2$, $W_3$) may indicate the "importance" of the corresponding modality in determining whether the content of the data streams 114, 124, 134 is synchronized. As a non-limiting example, if the weight ($W_1$) is relatively large compared to the weights ($W_2$, $W_3$), visual properties of the content may be more important than audio properties and linguistic properties in determining whether the content is synchronized. With respect to the hidden layer, the ANN node 208 may apply a weight ($W_4$) to a product of the vectors 236, 238, and the ANN node 210 may apply a weight ($W_5$) of product of the vectors 240, 242. With respect to the output layer, the ANN node 212 may apply a weight ($W_6$) to a product of the vectors 244, 246.

Each weight ($W_1$-$W_6$) may be adjusted during training of the analytical network 109 by comparing an output 250 to a known value that indicates whether the content of input data streams is synchronized. For example, if a known value indicates that content of corresponding input data streams is synchronized but the output 250 has a binary value of "0", then the value of one or more weights ($W_1$-$W_6$) may be adjusted until the output indicates a binary value of "1". The weights ($W_1$-$W_6$) may be iteratively adjusted during training until a threshold number of values at the output 250 accurately reflect corresponding known values.

After the ANN nodes 202-212 have been trained, analytical network 109 may use the weights ($W_1$-$W_6$) to determine whether the particular content of the data streams 114, 124, 134 is synchronized. As described above, the modality processing network 201 may generate modality-based vectors 203, 205, 207 in response to receiving the data streams 114, 124, 134, and the modality processing network 201 may provide the vectors 203, 205, 207 to the ANN nodes 202, 204, 206, respectively.

The ANN node 202 may apply the "trained" weight ($W_1$) to the vector 203 to generate a first weighted vector. The ANN node 202 may be configured to generate a vector 230 by applying an activation function ($F_1$) (e.g., a transfer function) to the first weighted vector. The vector 230 may be provided to the MLN node 214. In a similar manner, the ANN node 204 may apply the trained weight ($W_2$) to the vector 205 to generate a second weighted vector. The ANN node 204 may be configured to generate a vector 232 by applying an activation function ($F_2$) to the second weighted vector. The vector 232 may be provided to the MLN nodes 216, 218. Similarly, the ANN node 206 may apply the trained weight ($W_3$) to the vector 207 to generate a third weighted vector. The ANN node 206 may be configured to generate a vector 234 by applying an activation function ($F_3$) to the third weighted vector. The vector 234 may be provided to the MLN node 220.

As described above, the ANN nodes 202-212 may be trained to determine whether the particular content of the data streams 114, 124, 134 is synchronized. To improve accuracy associated with the statistical driven methodology of the ANN nodes 202-212, the MLN nodes 214, 216, 218, 220 may be super-imposed in the analytical network 109 to interpret syntactic statistics of the different modalities and modify the vectors based on the syntactic statistics.

To illustrate, the vector 203 may be provided to the MLN node 214. The MLN node 214 may be configured to receive an output of the ANN node 202 (e.g., the vector 230) and may generate the vector 236 based on the vector 203 and the vector 230. For example, the MLN node 214 may formulate first order logical rules between visual properties of each data stream 114, 124, 134 and the respective platforms 110, 120, 130. The first order logical rules may be implemented using Boolean information (e.g., AND information, OR information, and NOR information). To illustrate, the first order logical rules may determine a probability that a particular visual property indicated by the vector 230 is based on the first platform 110 (e.g., the first data stream 114), a probability that a particular visual property indicated by the vector 230 is based on the second platform 120 (e.g., the second data stream 124), and a probability that a particular visual property indicated by the vector 230 is based on the third platform 130 (e.g., the third data stream 134). Based on the first order logical rules, the MLN node 214 may generate the vector 236. For example, the vector 236 may include a modified version of the vector 230 based on syntactic statistics determined at the MLN node 214. The vector 236 may be provided to the ANN node 208.

The vector 205 may be provided to the MLN nodes 216, 218. The MLN nodes 216, 218 be configured to receive an output of the ANN node 204 (e.g., the vector 232) and may generate the vectors 238, 240, respectively, based on the vector 205 and the vector 232. For example, the MLN nodes 216, 218 may formulate first order logical rules between audio properties of each data stream 114, 124, 134 and the respective platforms 110, 120, 130. To illustrate, the first order logical rules may determine a probability that a particular audio property indicated by the vector 232 is based on the first platform 110, a probability that a particular audio property indicated by the vector 232 is based on the second platform 120, and a probability that a particular audio property indicated by the vector 232 is based on the third platform 130. Based on the first order logical rules, the MLN nodes 216, 218 may generate the vector 238, 240, respectively. For example, the vectors 238, 240 may include modified versions of the vector 232 based on syntactic statistics determined at the MLN node 216, 218. The vector 238 may be provided to the ANN node 208, and the vector 240 may be provided to the ANN node 210.

The vector 207 may be provided to the MLN node 220, and the MLN node 220 may generate the vector 242 based on the vector 207 and the vector 234. For example, the MLN node 220 may formulate first order logical rules between linguistic properties of each data stream 114, 124, 134 and the respective platforms 110, 120, 130. To illustrate, the first order logical rules may determine a probability that a particular linguistic property indicated by the vector 234 is based on the first platform 110, a probability that a particular linguistic property indicated by the vector 234 is based on the second platform 120, and a probability that a particular linguistic property indicated by the vector 234 is based on the third platform 130. Based on the first order logical rules, the MLN node 220 may generate the vector 242. For example, the vector 242 may include a modified version of the vector 234 based on syntactic statistics determined at the MLN node 220. The vector 242 may be provided to the ANN node 210.

The ANN node 208 may apply the trained weight ($W_4$) to the product of the vector 236 and the vector 238 to generate a fourth weighted vector. The ANN node 208 may be configured to generate the vector 244 by applying an activation function ($F_4$) to the fourth weighted vector. The vector 244 may be provided to the ANN node 212. The ANN node 210 may apply the trained weight ($W_5$) to the product of the vector 240 and the vector 242 to generate a fifth weighted vector. The ANN node 210 may be configured to generate the vector 246 by applying an activation function ($F_5$) to the fifth weighted vector. The vector 246 may be provided to the ANN node 212. The ANN node 212 may apply the "trained" weight ($W_6$) to the product of the vector 244 and the vector 246 to generate a sixth weighted vector. The ANN node 212 may be configured to generate the output 250 by applying an activation function ($F_6$) to the sixth weighted vector. As described above, the analytical network 109 may indicate that the particular content is synchronized if the output 250 has a binary value of "1", and the analytical network 109 may indicate that the particular content is not synchronized if the output 250 has a binary value of "0".

The analytical network 109 of FIG. 2 may determine whether the particular content from each data stream 114, 124, 134 is synchronized based on statistical and syntactic learning methodologies. For example, the ANN nodes 202, 204, 206, 208, 210, 212 may be statistic-driven nodes that are configured to generate the output 250 indicating whether the particular content is synchronized. To improve accuracy associated with the statistic-driven methodology of the ANN nodes 202, 204, 206, 208, 210, 212, the MLN nodes 214, 216, 218, 220 may be super-imposed in the analytical network 109 to interpret syntactic statistics of the different modalities and modify the vectors based on the syntactic statistics.

It should be noted that although the analytical network 109 of FIG. 2 is described as being configured to determine whether the particular content is synchronized, the specific function (or functions) performed by the analytical network 109 may be based on the configuration and logic of the MLN nodes 214, 216, 218, 220 and the ALN nodes 202, 204, 206, 208, 210, 212. For example, additional (or fewer) MLN nodes and/or ALN nodes may be included in the analytical network 109. Also, the logic of the nodes may be configured to perform different functions. For example, the logic of the nodes may enable the analytical network 109 to identify user content preferences based on content provided by the multiple platforms 110, 120, 130, integrate user profiles across the multiple platforms 110, 120, 130, perform other functions, or a combination thereof. The user profiles may be built in a hierarchical manner based on the feature vector responses at the nodes. While the ANN nodes 202, 204, 206 "influence" the responses at the MLN nodes 214, 216, 218, 220, the responses subsequently have an effect on the next layer of ANN nodes 208, 210, and so on. Patterns may be mined by concatenating features from the nodes 202, 204, 206, 208, 210, 212, 214, 216, 218, 220 to create a profile specific to the user. The patterns may be mined based on the content and delivery modalities using the training, validation, and testing paradigm of machine learning. Feature concatenation may be an effective methodology for directing an algorithm to identify correlations across permutations of nodes to effectively discover hidden patterns. Labeled training data may be used to provide an initial estimate of weight values applied to the nodes 202, 204, 206, 208, 210, 212, 214, 216, 218, 220 to construct the user profiles, and the labeled training data may be automatically "refined" by processing subsequent data. It should be also appreciated that for different functions, the output 250 may be a non-binary value (or a vector representation of data) indicative of the particular function to be performed.

Figure 3:
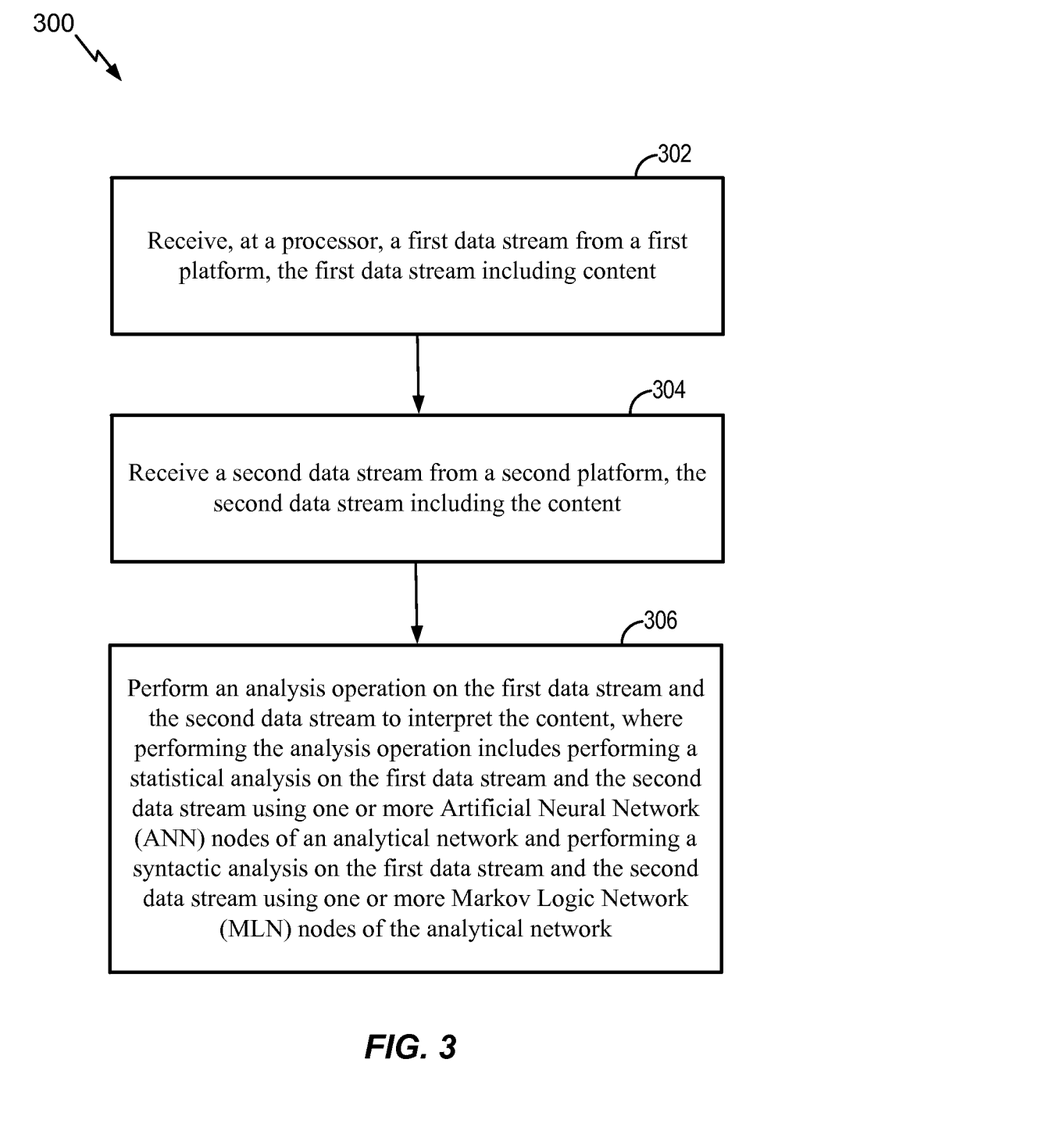
FIG. 3 is a flowchart of a method for interpreting content delivered from multiple platforms.

Referring to FIG. 3, a flowchart of a method 300 for interpreting content delivered from multiple platforms is shown. The method may be performed by the multimedia device 102 of FIG. 1, the processor 108 of FIG. 1, the analytical network 109 of FIGS. 1-2, or a combination thereof.

The method 300 includes receiving, at a processor, a first data stream from a first platform, at 302. The first data stream may include particular content. For example, referring to FIGS. 1-2, the modality processing network 201 of the analytical network 109 may receive the first data stream 114 from the first platform 110. According to one implementation, the first platform 110 may be a television platform and the particular content may include streaming video.

A second data stream may be received from a second platform, at 304. The second data stream may also include the particular content. For example, referring to FIGS. 1-2, the modality processing network 201 of the analytical network 109 may receive the second data stream 124 from the second platform 120. The second platform 120 may be a mobile platform. According to one implementation, the method 300 may also include receiving a third data stream from a third platform, where the third data stream also includes the particular content. For example, referring to FIGS. 1-2, the modality processing network 201 of the analytical network 109 may receive the third data stream 134 from the third platform 130. The third platform 130 may be an internet platform.

An analysis operation may be performed on the first data stream and the second data stream to interpret the content, at 306. Performing the analysis operation may include performing a statistical analysis on the first data stream and the second data stream using one or more Artificial Neural Network nodes of an analytical network. Performing the analysis operation also includes performing a syntactic analysis on the first data stream and the second data stream using one or more Markov Logic Network (MLN) nodes of the analytical network. For example, referring to FIG. 2, the data streams 114, 124, 134 may be provided to the analytical network 109 to interpret the particular content across the platforms 110, 120, 130. According to one implementation, interpreting the particular content includes determining whether the particular content is synchronized across the platforms 110, 120, 130. According to another implementation, interpreting the particular content includes identifying user content preferences based on the particular content. According to yet another implementation, interpreting the particular content includes integrating user profiles across the platforms 110, 120, 130 based on the particular content.

According to one implementation, the method 300 may include generating a first vector based on a first modality of the particular content. The first vector may have a first component associated with the first data stream and a second component associated with the second data stream. For example, referring to FIG. 2, the modality processing network 201 may generate the vector 203 based on the first modality (e.g., visual properties) of the particular content. The vector 203 may have a first component indicative of visual properties of the first data stream 114 and a second component indicative of visual properties of the second data stream 124. The method 300 may also include generating a second vector based on a second modality of the particular content. The second vector may have a first component associated with the first data stream and a second component associated with the second data stream. For example, referring to FIG. 2, the modality processing network 201 may generate the vector 205 based on the second modality (e.g., audio properties) of the particular content. The vector 205 may have a first component indicative of audio properties of the first data stream 114 and a second component indicative of audio properties of the second data stream 124. The first vector may be provided to a first ANN node (e.g., the ANN node 202), and the second vector may be provided to a second ANN node (e.g., the ANN node 204).

According to one implementation, the method 300 may include applying a first weight to the first vector to generate a first weighted vector. For example, the ANN node 202 may apply the weight ($W_1$) to the vector 203 to generate the first weighted vector. The method 300 may also include applying a first activation function to the first weighted vector to generate a first modified vector. For example, the ANN node 202 may apply the activation function ($F_1$) to the first weighed vector to generate the vector 230. The first modified vector may be provided to a first MLN node (e.g., the MLN node 214). The method 300 may also include applying a second weight to the second vector to generate a second weighted vector. For example, the ANN node 204 may apply the weight ($W_2$) to the vector 205 to generate the second weighted vector. The method 300 may also include applying a second activation function to the second weighted vector to generate a second modified vector. For example, the ANN node 204 may apply the activation function ($F_2$) to the second weighed vector to generate the vector 232. The second modified vector may be provided to a second MLN node (e.g., the MLN node 216).

According to one implementation, the method 300 may include applying first order logic to the first modified vector and to the first vector using Boolean information to determine first syntactic statistics associated with the first vector and the first modified vector. For example, the MLN node 214 may formulate first order logical rules using Boolean information and apply the first order logic rules to the vectors 203, 230 to generate first syntactic statistics. The method 300 may also include generating a first resulting vector based on the first syntactic statistics. For example, the MLN node 214 may generate the vector 236 based on the first syntactic statistics. The method 300 may also include applying first order logic to the second modified vector and to the second vector using Boolean information to determine second syntactic statistics associated with the second vector and the second modified vector. For example, the MLN node 216 may formulate first order logical rules using Boolean information and apply the first order logic rules to the vectors 205, 232 to generate second syntactic statistics. The method 300 may also include generating a second resulting vector based on the second syntactic statistics. For example, the MLN node 216 may generate the vector 238 based on the second syntactic statistics.

According to one implementation, interpreting the particular content may be based at least in part on the first resulting vector and the second resulting vector. For example, as described with respect to FIG. 2, the output 250 may be based at least in part on the vector 236 and the vector 238.

The method 300 of FIG. 3 may use statistical and syntactic learning methodologies by combining principles from Artificial Neural Networks and Markov Logic Networks to interpret content from multiple platforms 110, 120, 130. For example, the data streams 114, 124, 134 obtained from the different platforms 110, 120, 130 may undergo feature selection (e.g., modality selection) and/or distance metric selection and resulting vectors may be provided to Artificial Neural Network nodes of the analytical network 109. Syntactic patterns (e.g., Markov Logic Networks nodes) may be super-imposed to determine relationships between the content modalities and platforms 110, 120, 130 by integrating logic rules in the form of AND, OR, and NOR information and by merging the logic rules with probabilistic estimates using principles from Gaussian parametric models. One advantage of intertwining ANN and MLN is to holistically harness the respective statistic properties of ANNs and syntactic properties of MLNs. As a result, the network may become more complex using major-minimal techniques with manifold embeddings which may produce results that are closer to a "preferred" solution. Another advantage may be a reduction in reliance on pure statistics (e.g., a network based solely on ANN nodes), as most of the content generated across modalities have an inherent geometric syntactic that may be expressed using MLN nodes, which may provide more value to the data.

Figure 4:
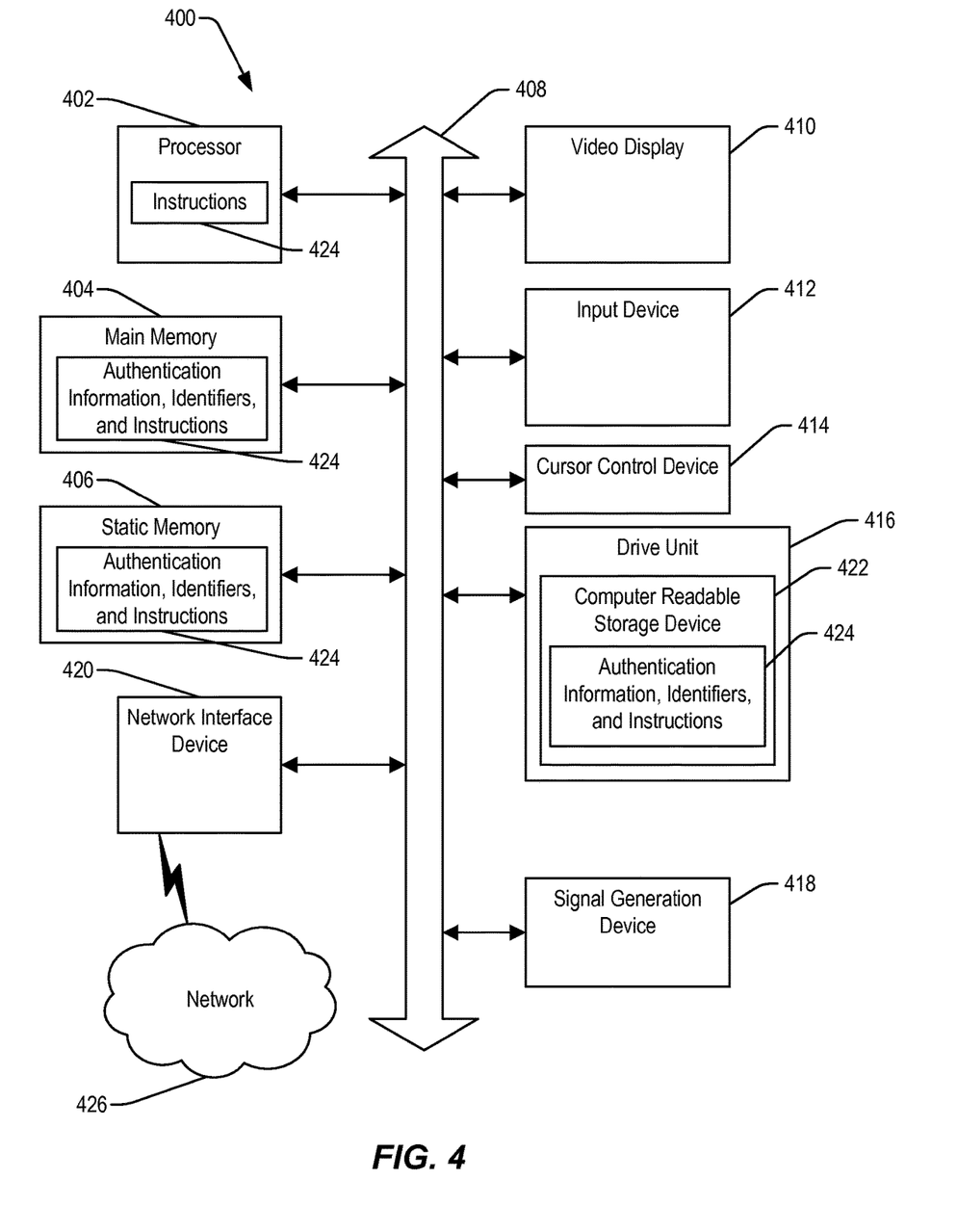
FIG. 4 is a block diagram of a general computer system.

Referring to FIG. 4, an illustrative implementation of a general computer system is shown and is designated 400. The computer system 400 includes a set of instructions (e.g., the instructions 424 in the memory 404) that can be executed to cause the computer system 400 to perform the method 300 or computer based functions disclosed herein. The computer system 400 may operate as a standalone device or may be connected (e.g., using a network) to other computer systems or peripheral devices. For example, the computer system 400 may include or may be included within the multimedia device 102 of FIG. 1.

In a networked deployment, the computer system 400 may operate in the capacity of a server or as a client user computer in a server-client user network environment, or as a peer computer system in a peer-to-peer (or distributed) network environment. The computer system 400 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box (STB) device, a customer premises equipment device, an endpoint device, a web appliance, or any other machine capable of executing a set of instructions (sequential or otherwise) that specify actions to be taken by that machine. In a particular implementation, the computer system 400 may be implemented using electronic devices that provide video, audio, data communication, or combinations thereof. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402 (e.g., a central processing unit (CPU), a graphics processing unit (GPU), or both). For example, the processor 402 may include or correspond to the processor 108 of the multimedia device 102. Moreover, the computer system 400 may include a main memory 404 and a static memory 406, which can communicate with each other via a bus 408. For example, the main memory 404 may include or correspond to the memory 104 of the multimedia device 102. As shown, the computer system 400 may further include a video display unit 410, such as a liquid crystal display (LCD), a light emitting diode (LED) display, a touch screen display, a flat panel display, a solid state display, or a lamp assembly of a projection system. Additionally, the computer system 400 may include an input device 412, such as a remote control device (e.g., a television remote or a set-top box remote), a keyboard, a joystick, another type of input device, or combinations thereof. In addition, the computer system 400 may include a cursor control device 414 (e.g., a mouse). In some implementations, the input device 412 and the cursor control device 414 may be integrated into a single device, such as a capacitive touch screen input device. The computer system 400 may also include a drive unit 416, a signal generation device 418, such as a speaker or remote control, and a network interface device 420. Some computer systems 400 may not include an input device (e.g., a server may not include an input device).

In a particular implementation, as depicted in FIG. 4, the drive unit 416 may include a computer-readable storage device 422 in which authentication information, identifiers, and one or more sets of instructions 424, e.g. software, can be embedded. The computer-readable storage device 422 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 424 may embody one or more of the methods or logic as described herein. The instructions 424 may be executable by the processor 402 to perform one or more functions or methods described herein, such as the method 300 described with reference to FIG. 3. In a particular implementation, the authentication information, identifiers, and instructions 424 may reside completely, or at least partially, within the main memory 404, the static memory 406, and/or within the processor 402 during execution by the computer system 400. The main memory 404 and the processor 402 also may include a computer-readable storage device. The authentication information included in the authentication information, identifiers, and instructions 424 in the drive unit 416, the main memory 404, the static memory 406, the processor 402, or combinations thereof may be transmitted to another computer system to enable authentication of the computer system 400, and the identifiers may include a list of identifiers used to authenticate the other computer system, prior to sharing a resource with the other computer system.

In an alternative implementation, dedicated hardware implementations, such as application specific integrated circuits, programmable logic arrays and other hardware devices, may be constructed to implement one or more of the methods described herein. Various implementations may include a variety of electronic and computer systems. One or more implementations described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various implementations of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting implementation, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 400 may communicate with one or more external systems via a network 426. First data stored by the computer-readable storage device 422 may be sent to the one or more external systems via the network 426. Also, second data may be received by the computer system 400 via the network 426. The second data may be stored by the processor 402 to the computer-readable storage device. Additionally, while the computer-readable storage device 422 is shown to be a single device, the computer-readable storage device 422 may be a single device or may be multiple devices, such as a centralized or distributed database, and/or associated caches and servers that store one or more sets of instructions. The computer-readable storage device 422 is capable of storing a set of instructions for execution by the processor 402 to cause the computer system 400 to perform any one or more of the methods or operations disclosed herein.

In a particular non-limiting, exemplary implementation, the computer-readable storage device 422 may include a solid-state memory such as embedded memory (or a memory card or other package that houses one or more non-volatile read-only memories). Further, the computer-readable storage device 422 may include a random access memory or other volatile re-writable memory. Additionally, the computer-readable storage device 422 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 400 in selected implementations.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations.

Less than all of the steps or functions described with respect to the exemplary processes or methods can also be performed in one or more of the exemplary implementations. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary implementations can facilitate one or more functions, where the facilitating (e.g., facilitating access or facilitating establishing a connection) can include less than every step needed to perform the function or can include all of the steps needed to perform the function.

In one or more implementations, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more implementations, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other implementations, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a processor, a first data stream from a first platform, the first data stream including content;
   receiving a second data stream from a second platform, the second data stream including the content;
   generating a first vector based on a first modality of the content, wherein the first modality includes visual properties of the content, and wherein the first vector has a first component associated with the first data stream and a second component associated with the second data stream,
   generating a second vector based on a second modality of the content, wherein the second vector includes audio properties of the content, and wherein the second vector has a first component associated with the first data stream and a second component associated with the second data stream; and
   performing an analysis operation on the first data stream and the second data stream to interpret the content, wherein performing the analysis operation comprises:
      performing a statistical analysis on the first data stream and the second data stream using artificial neural network nodes of an analytical network by providing a first artificial neural network node of the analytical network with the first vector and by providing a second artificial neural network node of the analytical network with the second vector; and
      performing a syntactic analysis on the first data stream and the second data stream using Markov logic network nodes of the analytical network.

2. The method of claim 1, wherein interpreting the content includes determining whether the content from the first data stream is synchronized with the content from the second data stream.

3. The method of claim 1, wherein interpreting the content includes identifying user content preferences based on the content.

4. The method of claim 1, wherein interpreting the content includes integrating user profiles across the first platform and the second platform based on the content.

5. The method of claim 1, further comprising providing a result of the first artificial neural network node to a Markov logic network node of the analytic network.

6. The method of claim 1, further comprising:
   at the first artificial neural network node:
      applying a first weight to the first vector to generate a first weighted vector;
      applying a first activation function to the first weighted vector to generate a first modified vector; and
      providing the first modified vector to a first Markov logic network node; and
   at the second artificial neural network node:
      applying a second weight to the second vector to generate a second weighted vector;
      applying a second activation function to the second weighted vector to generate a second modified vector; and
      providing the second modified vector to a second Markov logic network node.

7. The method of claim 6, further comprising:
   at the first Markov logic network node:
      applying first order logic to the first modified vector and to the first vector using Boolean information to determine first syntactic statistics associated with the first vector and the first modified vector; and
      generating a first resulting vector based on the first syntactic statistics; and
   at the second Markov logic network node:
      applying first order logic to the second modified vector and to the second vector using Boolean information to determine second syntactic statistics associated with the second vector and the second modified vector; and
      generating a second resulting vector based on the second syntactic statistics.

8. The method of claim 1, further comprising providing a result of the second artificial neural network node to a Markov logic network node of the analytic network.

9. An apparatus comprising:
   a first artificial neural network node configured to receive a first vector based on a first modality of content, the content included in a first data stream from a first platform and included in a second data stream from a second platform, apply a first weight to the first vector to generate a first weighted vector, and apply a first activation function to the first weighted vector to generate a first modified vector;
   a second artificial neural network node configured to receive a second vector based on a second modality of the content;
   a first Markov logic network node configured to receive the first modified vector; and a second Markov logic network node configured to receive an output of the second artificial neural network node, wherein the first artificial neural network node, the second artificial neural network node, the first Markov logic network node, and the second Markov logic network node are included in an analytical network configured to perform an analysis operation on the first data stream and the second data stream to interpret the content.

10. The apparatus of claim 9, wherein the analysis operation determines whether the content from the first data stream is synchronized with the content from the second data stream.

11. The apparatus of claim 9, wherein the analysis operation identifies user content preferences based on the content.

12. The apparatus of claim 9, wherein the analysis operation integrates user profiles across the first platform and the second platform based on the content.

13. The apparatus of claim 9, wherein the first modality of the content includes visual properties of the content, and wherein the second modality of the content includes audio properties of the content.

14. The apparatus of claim 9, wherein the second artificial neural network node is configured to:
apply a second weight to the second vector to generate a second weighted vector;
apply a second activation function to the second weighted vector to generate a second modified vector; and
provide the second modified vector to the second Markov logic network node.

15. The apparatus of claim 14, wherein the first Markov logic network node is configured to:
apply first order logic to the first modified vector and to the first vector using Boolean information to determine first syntactic statistics associated with the first vector and the first modified vector; and
generate a first resulting vector based on the first syntactic statistics.

16. The apparatus of claim 15, wherein the second Markov logic network node is configured to;
apply first order logic to the second modified vector and to the second vector using Boolean information to determine second syntactic statistics associated with the second vector and the second modified vector; and
generate a second resulting vector based on the second syntactic statistics.

17. The apparatus of claim 14, wherein the first Markov logic network node is configured to receive a first result from the first artificial neural network node, and wherein the second Markov logic network node is configured to receive a second result from the second artificial neural network node.

18. A computer-readable storage device comprising instructions that, when executed by a processor, cause the processor to perform operations comprising:
receiving a first data stream from a first platform, the first data stream including content;
receiving a second data stream from a second platform, the second data stream including the content;
generating a first vector based on a first modality of the content, the first vector having a first component associated with the first data stream and a second component associated with the second data stream;
generating a second vector based on a second modality of the content, the second vector having a first component associated with the first data stream and a second component associated with the second data stream; and
performing an analysis operation on the first data stream and the second data stream to interpret the content, wherein performing the analysis operation comprises:
performing a statistical analysis on the first data stream and the second data stream using artificial neural network nodes of an analytical network by providing a first artificial neural network node of the analytical network with the first vector and by providing a second artificial neural network node of the analytical network with the second vector, wherein the first artificial neural network node applies a first weight to the first vector to generate a first weighted vector and applies a first activation function to the first weighted vector to generate a first modified vector, and wherein the second artificial neural network node applies a second weight to the second vector to generate a second weighted vector and applies a second activation function to the second weighted vector to generate a second modified vector; and
performing a syntactic analysis on the first data stream and the second data stream using Markov logic network nodes of the analytical network, wherein a first Markov logic network node of the analytic network receives the first modified vector from the first artificial neural network node, and wherein a second Markov logic network node of the analytic network received the second modified vector from the second artificial neural network node.

19. The computer-readable storage device of claim 18, wherein interpreting the content includes determining whether the content from the first data stream is synchronized with the content from the second data stream.

20. The computer-readable storage device of claim 18, wherein interpreting the content includes identifying user content preferences based on the content.

\* \* \* \* \*